United States Patent [19]

LeNay et al.

[11] 3,848,241

[45] Nov. 12, 1974

[54] TEST AND INTEGRITY EQUIPMENT FOR A MCCULLOH SYSTEM

[75] Inventors: Tom W. LeNay, Encino; Donald L. Hadden, Fountain Valley, both of Calif.

[73] Assignee: Baker Industries, Inc., Parsippany, N.J.

[22] Filed: Mar. 15, 1973

[21] Appl. No.: 341,540

[52] U.S. Cl. .................. 340/214, 340/408, 340/409, 340/411, 340/295, 340/292

[51] Int. Cl. .................. G08b 13/00, G08b 29/00

[58] Field of Search .................. 340/152 T, 167 P, 340/172, 214, 292, 295, 409, 411, 410, 408; 325/67, 363

[56] References Cited

UNITED STATES PATENTS

| | | | |
|---|---|---|---|
| 3,254,334 | 5/1966 | Mitchell | 340/214 |
| 3,623,049 | 11/1971 | Hill | 340/214 |
| 3,662,383 | 5/1972 | Ajmani | 340/409 |
| 3,678,509 | 7/1972 | Carlo et al. | 340/409 |
| 3,716,834 | 2/1973 | Adams | 340/147 R |
| 3,737,765 | 6/1973 | Lee et al. | 340/410 |
| 3,757,035 | 9/1973 | Sullivan | 340/408 |

*Primary Examiner*—John W. Caldwell
*Assistant Examiner*—Richard P. Lange
*Attorney, Agent, or Firm*—Lyon and Lyon

[57] ABSTRACT

An interrogation unit is connected between the feed and return line of a McCulloh alarm circuit (i.e. between a McCulloh receiver and a plurality of McCulloh transmitter) to maintain the line current relatively constant and not disturb or interfere with the basic McCulloh alarm function. The interrogation unit transmits a command signal to receive units which are serially connected with selected McCulloh transmitters in the basic McCulloh circuit. The command signal is a pulse having a polarity opposite that of the normal McCulloh alarm signal. During the command pulse time period, the McCulloh receiver is disconnected from the telephone line and connected to a circuit that maintains the previous current flowing into the McCulloh receiver. This provides substantially no interference with the normal alarm function of the McCulloh circuit. Each McCulloh transmitter initiates a reply pulse. Each reply pulse, which is at a magnitude much lower than the normal McCulloh alarm signal, provides information such as line integrity and alarm "set" information. The reply pulse level is sufficiently low to assure that there is no interference with normal McCulloh alarm signals.

10 Claims, 5 Drawing Figures

TEST AND INTEGRITY EQUIPMENT FOR A MCCULLOH SYSTEM

BACKGROUND OF THE INVENTION

This invention relates to equipment such as utilized to test line integrity, to locate a fault or a break in the line, or to remotely test an alarm unit per se.

More particularly, this system is used in the exclusive environment of what is commonly known in the art as a McCulloh system or a McCulloh telephone circuit. An example of such a system is described in U.S. Pat. No. 253,080, issued on an application by McCulloh.

Basically, a McCulloh circuit includes receiving equipment (a McCulloh receiver) such as a DC voltage source and relays (or a solid state receiver in many modern adaptations) located at a central station. This equipment is connected through telephone lines to various subscriber alarm units and McCulloh transmitters. The alarm units may be of the fire and/or burglar types typical in alarm systems. The alarm units and McCulloh transmitters are typically connected in series and include a normally closed switch in series with the line and a normal open switch connected to ground. The switches are activated by means of a code wheel or the like, in a particular sequence usually in response to the operation of an associated alarm sensor.

When an alarm event occurs, the code wheel rotates and operates the switches, thereby providing a coded set of pulses. Each wheel has different teeth removed to realize a coded set of pulses which are typically indicative of the location of the alarm. Thus, a different code will result from the activation of each code wheel. Each pulse in the coded set produced by the activated code wheel typically presents information in three pulse intervals. In one arrangement, the first pulse interval represents the opening of the normally closed switch, the second pulse interval represents the closing of the normal open switch, and the third pulse interval represents the normal condition. That is, when the normally closed switch is opened, the entire series loop of the McCulloh circuit is broken, and when the normally open switch is closed, the series loop is grounded. Thus, the McCulloh circuit generates a coded set of pulses to indicate an alarm condition and the location of the alarm event, all in a manner known in the art.

Further, McCulloh circuits may allow certain line faults to be treated so as to receive signals in the face of these faults. For example, if one of the subscriber's telephone lines to an alarm unit becomes inadvertently grounded (because the line is hit by a tree, etc.) relays or the like, in the central station disconnect the return line connection (which is typically connected to the positive ground terminal of the source battery) and connect it to the negative terminal of the battery. Thus, in the event of a McCulloh signal being transmitted, the signal will be received either on the feed side or the return side of the telephone line.

Even though McCulloh alarm circuits provide a reliable and practical system, the need for means compatible therewith for testing the integrity of the system and for testing associated alarm units has not been satisfactorily realized.

Prior art attempts to solve this need have resulted in interfering with the vital alarm carrying function of the McCulloh circuits or have resulted in only a minimal amount of information as to the condition of the McCulloh circuit.

For example, line integrity information, that is, information indicating that the typical McCulloh transmitter located at the subscriber situs is connected in the total system (for an alarm to register in the central station is crucial to a reliable system.

Also, information that the alarm unit associated with the McCulloh transmitter is "set" and ready to send an alarm is vital to an efficient alarm operation. This set information is particularly important since many alarm units such as burglar alarms are set only after the business is closed, and also since many fire alarm units typically in use are not automatically "reset" after an alarm has been generated. Thus, a forgetful shopkeeper or a fire victim could negate the advantages of the McCulloh alarm circuit unless a system, such as that of the instant invention, is utilized as a check.

A third type of desirable information is the location of breaks or faults, such as shorts or opens, in the typical McCulloh circuit so that the circuit can quickly be restored to normal.

With the versatility of the instant invention, line integrity, set, and break information in the McCulloh circuit may readily be developed without hampering the normal McCulloh alarm function.

A still further feature in this system is the remote testing of electronic detection equipment associated with alarm equipment located on the subscriber's premises, all without generating a false McCulloh alarm in the central station.

These above-mentioned characteristics of the present invention, individually and collectively, in a McCulloh circuit environment, with an interrogation unit located at the central station which may readily be sequentially switched to "interrogate" any number of McCulloh circuits, results in an innovative and versatile test and integrity system for McCulloh circuit.

SUMMARY OF THE INVENTION

It is an object of this invention to provide an interrogation unit capable of being sequentially connected in a plurality of McCulloh circuits to determine information as to each McCulloh circuit.

It is another object of this invention to provide an interrogation unit for a McCulloh circuit capable of being sequentially connected to interrogate a plurality of McCulloh circuits without substantially interfering with the basic alarm function of the McCulloh circuit.

It is a further object of this invention to provide in a McCulloh circuit a receiver unit, connected in series with each alarm unit associated with each McCulloh transmitter, utilizing partially open and partially closed contacts to provide an interrogation unit with line integrity and set information.

It is a still further object of this invention to provide in a McCulloh circuit, versatile test equipment which will not interfere with the normal McCulloh alarm signal, but which will provide information as to several aspects of the McCulloh circuit.

Briefly stated, and according to one aspect of this invention, the foregoing objects are achieved by producing an interrogation unit capable of being sequentially switched to interrogate a plurality of McCulloh circuits without disturbing the normal McCulloh alarm operation.

The interrogation unit will, after sensing the McCulloh circuit to make sure a McCulloh alarm signal is not then being received, transmit a command signal through the McCulloh circuit to all the receivers connected in the circuit. The command signal will not activate a McCulloh receiver or the like, thereby preventing false alarm representations. Each receiver unit will sense this command signal and at the end thereof, an accurately controlled timing sequence will begin to allow each receiver unit to send a reply signal at a proper interval. Each receiver unit will send the reply signal, in a manner which will not activate or interfere with the McCulloh receiver, to reply to the interrogator with such information as line integrity and set condition of the McCulloh transmitter.

BRIEF DESCRIPTION OF THE DRAWINGS

The invention both as to its organization and principle of operation, together with further objects and advantages thereof, may be better understood by reference to the following detailed description of an embodiment of the invention when taken in conjunction with the accompanying drawings.

DESCRIPTION OF THE PREFERRED EMBODIMENT

Figure 1:
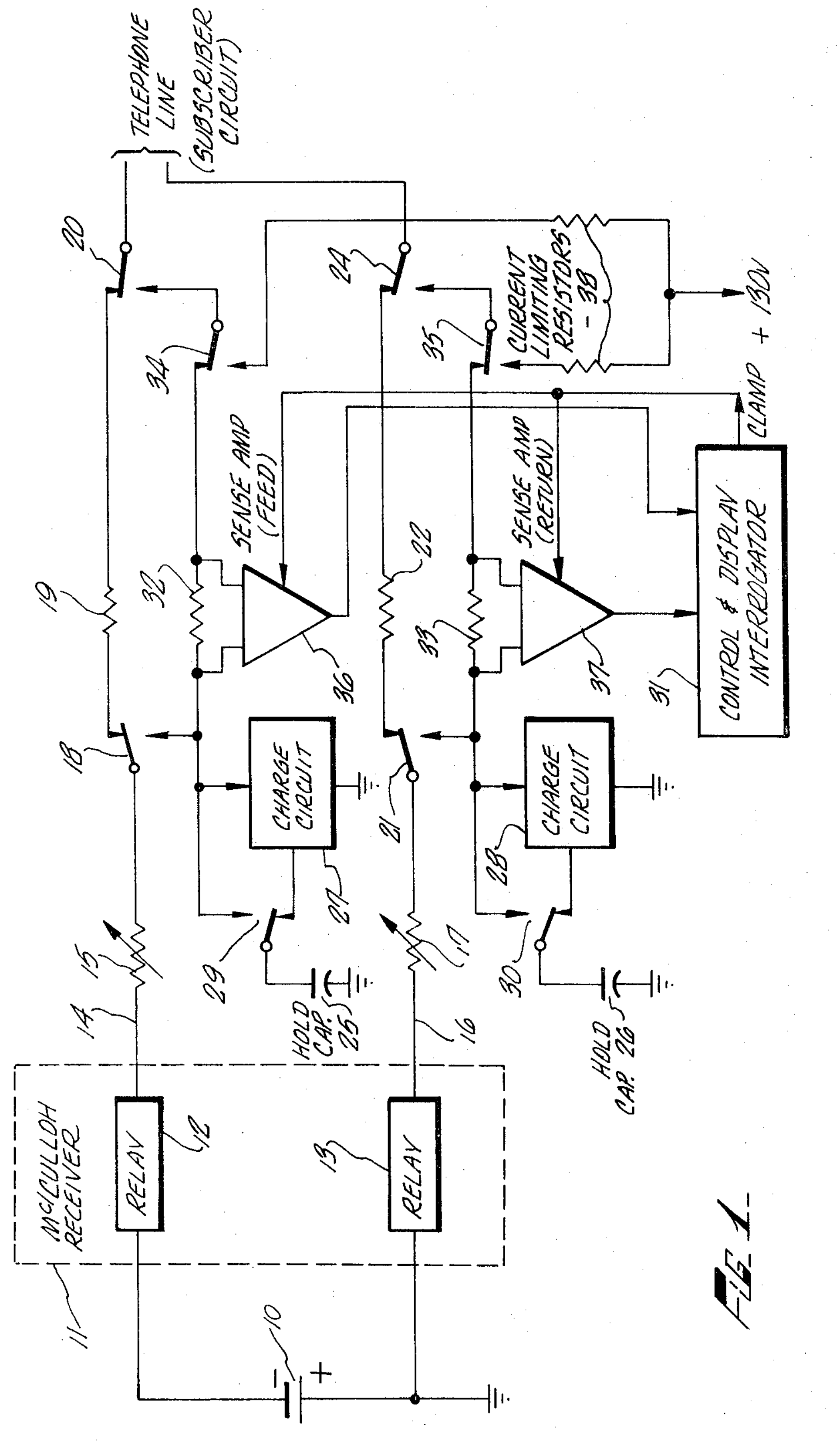
FIG. 1 is a system diagram illustrating an exemplary embodiment of the basic concepts of the McCulloh receiver, control and display interrogator and other equipment located at a central station, all capable of being connected in the basic McCulloh circuit in accordance with this invention.
Figure 5:
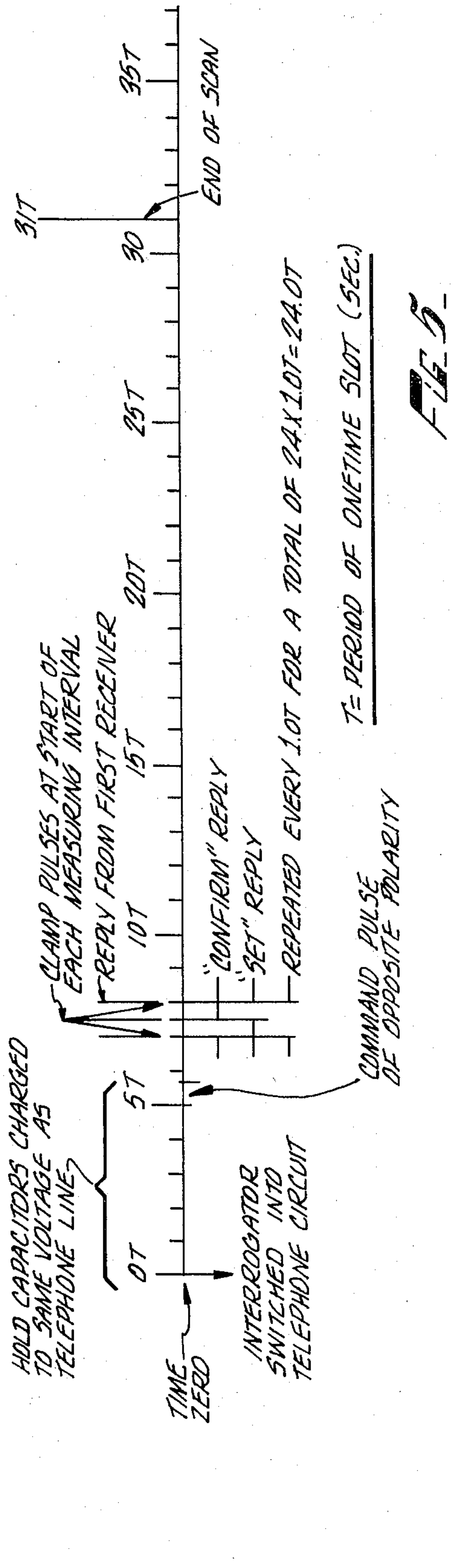
FIG. 5 is a timing sequence illustrative of the timing utilized in accordance with this invention.

Referring to FIG. 1, (as well as the timing sequence of FIG. 5) there is illustrated a McCulloh circuit at a central station comprising a McCulloh receiver 11 which includes a relay 12 and a relay 13 connected to the negative and positive terminals, respectively, of a DC source or battery 10. The relay 12 is connected on a feed line 14 to a variable resistor 15, likewise, relay 13 is connected on a return line 16 to a variable resistor 17. Variable resistors 15 and 17 are adjustable in order to achieve the proper current conditions in the McCulloh circuit, depending upon the number of subscribers serviced in a manner known in the art.

The McCulloh receiver 11 is illustrated as utilizing relays 12 and 13 to achieve battery pole switching during fault conditions in a manner to be described subsequently. However, the relays 12 and 13 may readily be replaced by a modern McCulloh receiver, usually in a solid state design.

When the McCulloh circuit is operating without the test and integrity equipment of the instant invention connected, the variable resistor 15 is connected to a resistor 19 through a relay 18 in a first position. The resistor 19 is in turn connected through a relay 20 in a first position to a telephone line and the subscriber's circuit. Likewise, when the McCulloh circuit is operating without any test and integrity equipment connected thereto, the variable resistor 17 is connected to a resistor 22 through a relay 21 in a first position. The resistor 22 is connected through a relay 24 in a first position to the telephone line and to the subscriber's circuit.

When the McCulloh circuit to be tested has been selected, relays 18, 20, 21 and 24 are switched to a second position thereby resulting in a resistor 32 being connected in series in the feed line 14, and a resistor 33 being connected in series in the return line 16. Resistor 32 is ultimately connected to the telephone line through a relay 34 in a first position and through a relay 20 in a second position. Likewise, resistor 33 is ultimately connected to the telephone line through a relay 35 in a first position and the relay 24 in a second position. The value of the resistor 19 is the same as that of resistor 32, likewise, resistor 22 is the same value as resistor 33. Thus, even when the interrogator unit 31 and its associated circuitry are connected in the McCulloh circuit, the current in the basic McCulloh circuit is maintained at a constant level. Typically, resistors 19, 32, 22 and 33 all have a low resistance value.

When relays 18, 20, 21 and 24 are switched to the second position, hold capacitors 25 and 26 are charged for 5.0 T (T being the period of one time slot in seconds, with a range of from 0.10 seconds to 10 seconds, i.e., the time for all replies from one receiver) by charge circuits 27 and 28, associated therewith so that the voltage across relays 29 and 30 beocme zero. Provided that no McCulloh alarm signal has been received during this time (i.e., the first 5.0 T), as determined in a manner to be subsequently described, and the voltage across the contacts 29 and 30 each become zero, a control and display interrogator unit 31 and associated circuitry are activated.

A feed sense amplifier 36 has its two inputs connected across resistor 32. Likewise, a return sense amplifier 37 has its two inputs connected across resistor 33. An output from each of the sense amplifiers 36 and 37 are connected to inputs of the control and display interrogator 31. The control and display interrogator 31 is connected at its output to a further input of the feed sense amplifier 36 and to a further input of the return sense amplifier 37. Finally, current limiting resistors 38 are provided between the relay 34 and the relay 35 for protective purposes known in the art.

The utilization of a sense amplifier 36 in the feed line 14 and the sense amplifier 37 in the return line 16 allows operation of the control and display interrogator unit 31, even in the face of a single fault (a short, ground, or open of the feed or return line), since either the feed line 14 or the return line 16 could be independently used as a path for the command and reply signals to be discussed later. Each sense amplifier 36 and 37 typically includes a low path filter to prevent 20 hartz and 60 hertz noise signals from being received. These filters (not shown) are utilized since 60 hertz noise is typical of power lines and 20 hertz noise is typical in telephone line communication lines as being the bell frequency.

Figure 2:
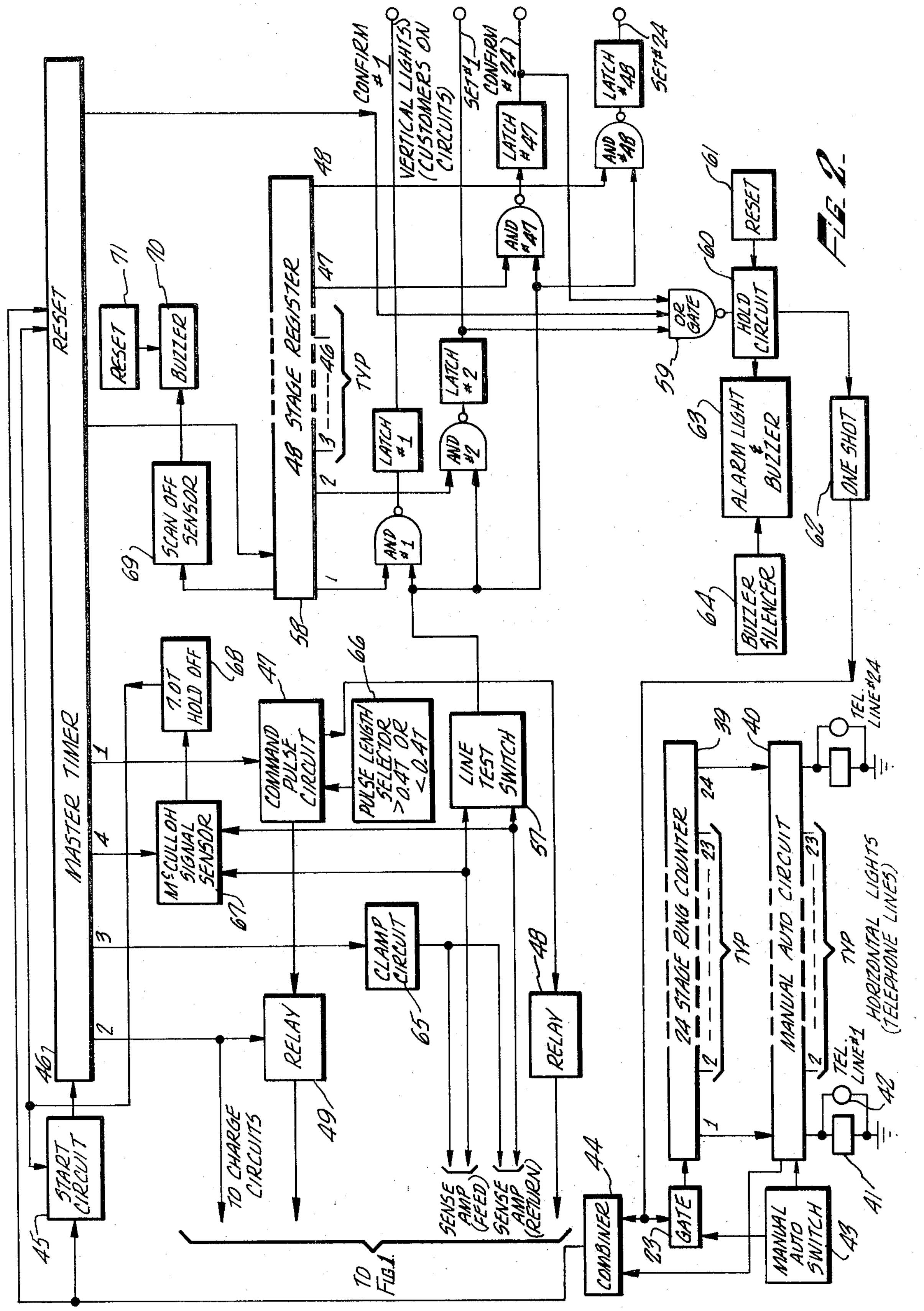
FIG. 2 is a more detailed view of a control and display interrogator utilized in accordance with this invention.

Referring now to FIG. 2, there is provided a 24-stage ring counter 39 connected to a manual automatic circuit 40, which in turn is connected to a plurality of telephone lines as designated by a plurality of horizontal lights and relays, such as relay 41 and light 42. A manual-automatic switch 43 is connected to an input of the manual-automatic circuit 40 and to an input of a gate 23. The gate 23 is in turn connected to the ring counter 39 and to a first input of a combiner 44. The manual-automatic circuit 40 is connected to a second input of the combiner 44. The combiner 44 is connected at its output to a start circuit 45. The start circuit 45 is connected to both a first input and a reset input of a master timer 46.

The master timer 46 is connected at a first output to an input of a command pulse circuit 47. The command pulse circuit 47 is connected at an output to a relay 48. A second output of the master timer 46 is connected to a relay 49.

Assuming that the control and display interrogator of FIG. 2 is in an automatic mode as determined by switch 43, and that telephone line No. 1 has been selected to be tested, (i.e., relay 41 is operated and the telephone line light 42 is on), for the first 5.0 T, the hold capacitors 25 and 26 (in FIG. 1) are charged so that the voltage across the contacts 29 and 30 become zero. Provided that no McCulloh signal has been received during this time, at time 5.0 T, a command pulse or signal of opposite polarity to the typical McCulloh signal, is generated by the command pulse circuit 47. The command pulse circuit 47 being initiated, after 5.0 T, by the master timer 46. The command pulse circuit 47 generates the command signal for approximately 0.25 T. This is accomplished by actuating relay 48, connected to the output of the command pulse circuit 47 for 0.25 T.

At the same time, relay 49 is actuated by the master timer 46 to switch-in the charged up capacitors 25 and 26 and thsu maintain the current through the McCulloh receiver 11. Relay 49 is held operated approximately 0.25 T longer than relay 48 in order to allow the telephone line to get back to normal before the hold capacitors 25 and 26 are switched out of the circuit.

Figure 3:
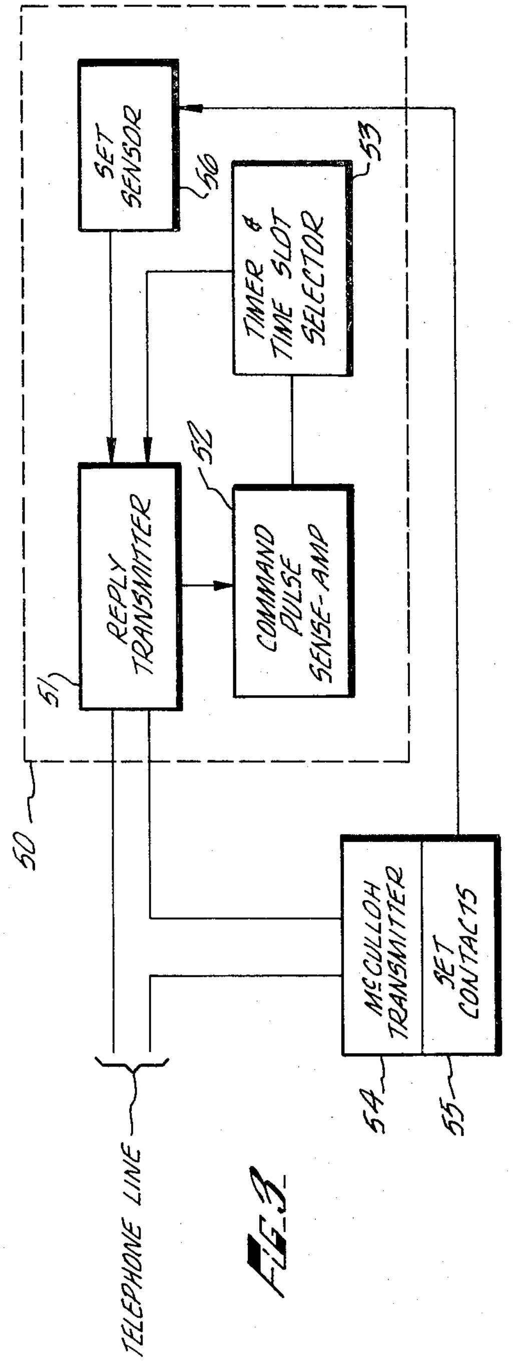
FIG. 3 is a system diagram illustrating an exemplary embodiment of the basic concepts of a receiver unit capable of being connected with a basic McCulloh transmitter at the subscriber's location in accordance with this invention.

Referring now to FIG. 3, the line integrity confirmer or receiver 50, is illustrated to include a reply transmitter 51 connected at its output to an input of a command pulse sense amplifier 52. The output of the command pulse sense amplifier 52 is connected to an input of a timer and time slot selector 53, which in turn is connected at its output to an input of the reply transmitter 51. The receiver 50 is connected at the subscriber's location to the typical McCulloh transmitter 54 and set contacts unit 55 through a set sensor 56 connected to a second input of the reply transmitter 51 in the receiver 50.

The command pulse or signal generated by the command pulse circuit 47 (in FIG. 2) is received at the receiver 50 by the command pulse sense amplifier 52, which in turn starts up the timer and time slot selector 53. The timer and time slot selector 53 determine at exactly what time this particular receiver should send a reply signal. Each receiver 50 has a different reply time so that interference between receivers should not occur.

A plurality of receivers, such as receiver 50, may be connected in series at the subscriber's site to the McCulloh transmitter and set contacts. The receivers may be installed at any or all of the locations of the McCulloh transmitter and set contacts.

The command pulse is transmitted through relays 34 and 35 (in FIG. 1) on both sides (i.e., feed and return) of the telephone line to the receiver units. All the receiver units sense the command signal produced by the command pulse circuit 47 in the interrogator 31, and at the end of the command signal, each receiver unit initiates an accurately controlled timing sequence. When the correct time occurs, the reply transmitter 51 (in FIG. 3) is actuated. The reply transmitter 51 sends a reply signal (approximately 10% McCulloh signal to prevent interference with the typical functioning of the McCulloh circuit). This low level reply pulse is readily achieved by providing normally partial open and normally partial closed switches through the use of resistors or constant current sources and switching circuitry known in the art. One pulse of the reply signal is always sent to confirm the line integrity, i.e., that the receiver is connected to the telephone line. A second pulse is sent 0.50 T later by the reply transmitter 51 if the McCulloh transmitter 54 is in a set condition. The set contacts 55 of the McCulloh transmitter 54 are monitored by the set sensor 56, which determines whether the reply transmitter 51 transmits the second reply pulse.

The reply signal made up of a single pulse or pulses is sensed by the feed and return sense amplifiers 36 and 37. The reply signal, through a line test switch 57 (in FIG. 2), is applied to logic circuitry comprising a series of AND gates and latches. Assuming that the receiver 50 (in FIG. 3) is the first to reply, then at approximately 7.0 to 7.5T, the No. 1 output of a 48-stage register 58 is enabled by the logic circuitry and the register 58 allows only the AND gate No. 1 to receive the first pulse reply from the receiver 50. If the reply pulse is received, the AND gate No. 1 causes latch No. 1 to latch causing confirm light No. 1 to come on. If no pulse is received during this time, confirm light No. 1 stays off. From 7.5 to 8.0T, only output No. 2 of the register 58 is enabled and it allows only AND gate No. 2 to receive the second pulse from the receiver 50. Again, if the pulse is received, the AND gate No. 2 causes latch No. 2 to latch, causing set light No. 1 to come on. This sequence is repeated for each 0.50T of time, until all 48 stages of the register 58 have been enabled and all 48 lights have the opportunity to have been lighted.

The logic circuitry referred to above is connected to inputs of an OR gate 59 which in turn is connected at its output to an input of a hold circuit 60. The hold circuit 60 also is connected to an input of a reset unit 61. A first output of the hold circuit 60 is connected to an input of a one shot 62 which is in turn connected to an input of the gate 23 and to the second input of the combiner 44. A second output of the hold circuit 60 is connected to an input of an alarm light and buzzer unit 63 which is connected at a second input to an output of a buzzer silencer 64.

If all the confirm lights are lighted, the OR gate 59, by way of the hold circuit 60, causes the one shot 62 to product a pulse which causes the ring counter 39 to shift up one position, and cause the start circuit 45 and the master timer 46 to be reset back to time zero.

When the ring counter 39 is caused to shift up one position, relay 41 is caused to release and thus return the telephone circuit associated with that relay back to normal. The shifting up one position of ring counter 39 also causes the relay associated with telephone line No. 2 (not shown) to operate, thus selecting the next telephone circuit to be tested for line confirmation. The command signal is sent out and the receiver's reply signal is used to energize the confirm and set lights. This procedure repeats for each one of the 24 telephone lines indefinitely. However, if at the end of receiving all of the reply signals from the receivers, one or more of the receivers has failed to send a reply confirm signal, the OR gate 59 senses this lack of confirmation, and causes the hold circuit 60 to stop the scanning. The hold circuit 60 causes the alarm light and buzzer unit 63 to cause the alarm light therein to come on and the buzzer therein to sound. Associated with the alarm light and buzzer unit 63 is a push button buzzer silencer 64. Pushing the button in, the buzzer silencer 64 stops the buzzer in the unit 63 and allows the operate to examine the reply lights and know which receiver unit or units did not reply. The hold circuit 60 also has associated therewith a push button reset unit 61. Pushing a push button in the reset unit 61, resets the panel and allows scanning to start again. The 24-stage ring counter 39 shifts to the next telephone line and repeats the procedure. Only when a confirm signal is not received does the scanning stop and cause an audible alarm.

If it is desirable to control a particular line manually, i.e., to test just a single telephone line, the manual-automatic switch 43 allows the operator, in a manual mode, to select any one of the 24 telephone circuits by pushing a push button immediately adjacent to the light associated with that circuit. This causes the start circuit 45 and the master timer 46 to be reset and go through sequence from time zero, thus giving a complete cycle.

Still referring to FIG. 2, a clamp circuit 65 is connected between a third output of the master timer 46 and the feed and return sense amplifiers 36 and 37. The clamp circuit 65 is actuated every 0.50T to provide a clamp pulse to each of the sense amplifiers 36 and 37. This causes the sense amplifiers 36 and 37 to be reset to a standard reference joint just before the reply from the receiver is received.

In FIG. 2, a pulse length selector unit 66 is connected to an input of the command pulse circuit 47. The pulse length selector circuit 66 determines if the command signal will be less than or greater than 0.40 T. If less than 0.40T, the reply pulse or pulses from the receiver will indicate set condition of the McCulloh transmitter. If greater than 0.40T, the reply pulses will indicate if an electronic detection device (to be discussed in referring to FIG. 4) located at the McCulloh transmitter site has tested the McCulloh transmitter and is working properly.

Connected in FIG. 2, between the sense amplifiers 36 and 37 and a fourth output of the master timer 46 is a Mc Culloh signal sensor 67 which determines if a regular McCulloh signal is being received. This is possible since a regular McCulloh signal is much larger than any reply signal from the receivers. If the McCulloh signal is sensed, the start circuit 45 and master timer 46 is reset and held until seven seconds after the last McCulloh signal. This 7.0T interval allows for time in between the rounds of a McCulloh signal. At the end of the reset signal, the sequence is started again from time zero. In this way, McCulloh signals are prevented from giving false indications on a confirm and set lights. The 7.0T hold off is provided by a hold-off unit 68 connected between the McCulloh signal sensor 67 and an input of start circuit 45 and the reset input of the master timer 46.

A scan off sensor unit 69 is connected at its input to an output of the 48-stage register 59. A buzzer unit 70 and a second reset 71 are coupled with the scan off sensor 69. The scan off sensor 69 is a timing circuit that senses if the scanning has stopped for any reason, i.e., the manual-automatic switch 43 left in manual, or the line test switch 57 left off normal, etc. If the scan has stopped for greater than three minutes, a buzzer in buzzer unit 70 sounds. The second reset 71 will cause the buzzer to stop, but unless the scan is restarted, the buzzer will sound again after three more minutes. In this way, the operator is prevented from leaving the receiver in a non-operating mode.

It is deemed to be now apparent that provisions may be made so that less than the typically used 24 telephone lines or less than the typically used 24 receivers per telephone lines can be scanned. Also, provisions may be scanned. Also, provisions may be realized to "plug out" time slots not being used so that they will not cause repeated alarm.

The location of line faults or breaks can readily be achieved by the practice of this invention utilizing the line test switch 57. The line test switch 57, in FIG. 2, allows the operator to receive either both feed and return sense amplifier outputs (normal position); feed sense amplifiers 36 only; and return sense amplifier 37 output only. Normally, the line test switch 57 is set to receive both the feed and return signals from the sense amplifiers 36 and 37. However, if the telephone line is cut, by placing the switch 57 to first sense the output of the feed sense amplifier 36 and then the output of the return sense amplifiers 37, the operator can determine which customers are replying on the feed side and which on the return side. With this information, the location of the fault (such as a cut telephone line) can more readily be determined.

Figure 4:
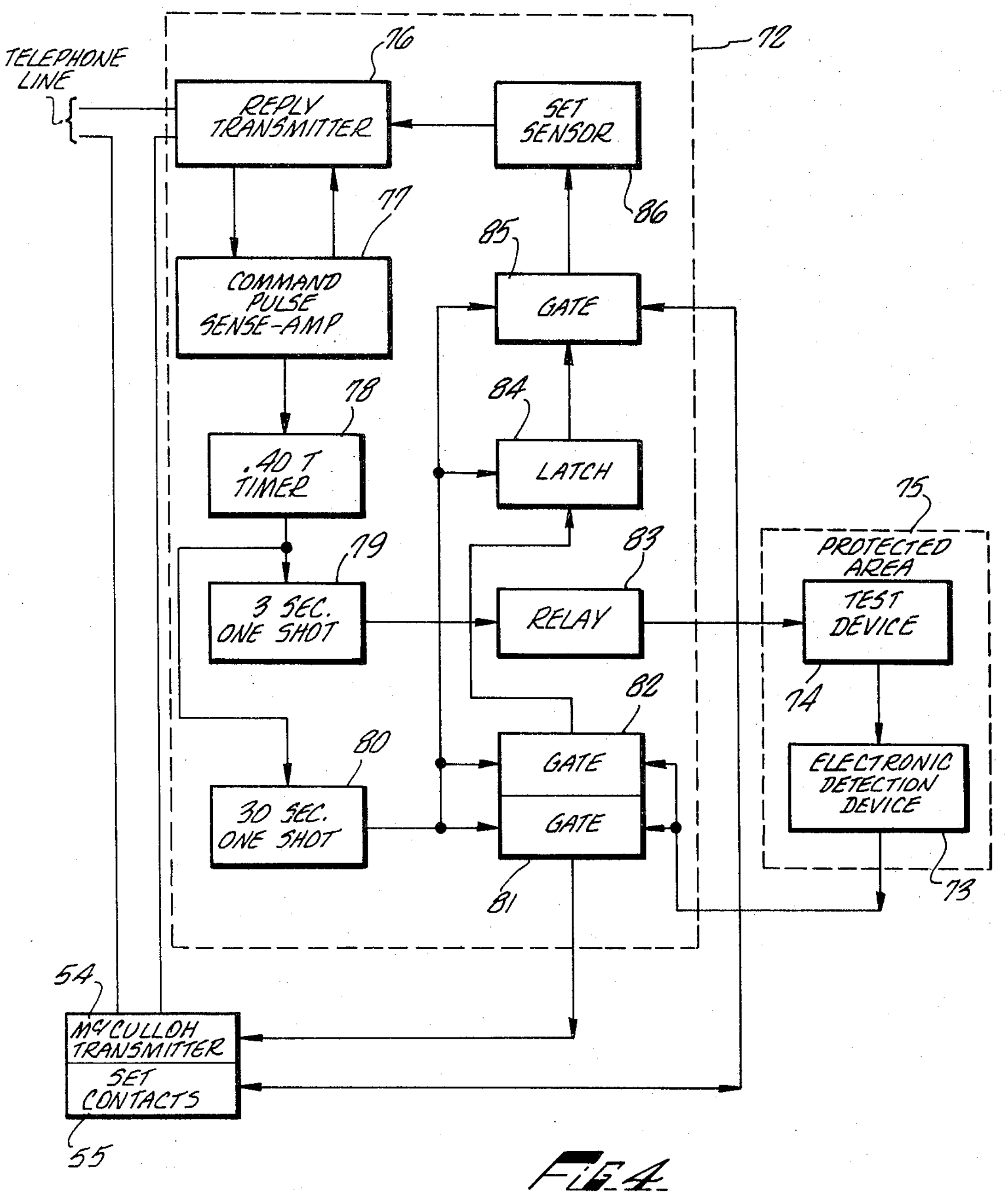
FIG. 4 is a system diagram illustrating an exemplary embodiment of the basic concepts of a system capble of being connected with the basic McCulloh transmitter to be utilized at the subscriber's location for remote testing in accordance with this invention.

Referring now to FIG. 4, there is illustrated a receiver unit 72 capable of remotely testing an electronic detection device 73 through a test device 74, both in a protected area 75. Also, included in FIG. 4 are the McCulloh transmitter 54 and set contacts 55 as discussed previously.

The receiver unit 72 includes a reply transmitter 76 and a command pulse sense amplifier unit 77. An output of the reply transmitter 76 being connected to an input of the unit 77 being connected to an input of the reply transmitter 76. An output of the command pulse sense amplifier unit 77 is also connected to an input of a 0.40T timer 78 which in turn is connected at its output to an input of a three second one shot 79 and an input of a 30-second one shot 80.

The output of the 30-second one shot 80 is connected to an input of gate 81, gate 82, latch 84, and gate 85. Gate 82 being connected to an input of gate 85 through latch 84. Gate 85 is connected at its output to an input of a set sensor 86 which in turn is connected at its output to an input of the reply transmitter 76.

The protected area 75 is connected to the receiver unit 72 from the output of the relay 83 to an input of the test device 72 and from an output of the electronic detection device 73 to inputs of gates 81 and 82.

Finally, gate 81 is connected at its output to an input of the McCulloh transmitter 54 and the set contacts 55 is connected at its output to an input of gate 85.

When a command signal is sent by way of the telephone line from the central station, the command pulse sense amplifier 77 receives the command signal and squares off the edges of the pulse. The output of the command pulse sense amplifier 77 is applied to a 0.40T timer 78. If the pulse length is less than 0.40T, there will be no output from the 0.40T timer 78. When this occurs, the set contacts 55 pass a signal by way of gate 85 to the set sensor 86 and then to the reply transmitter 76. when the reply signal is actuated, the condition of the set contacts 55 will be indicated by the second reply pulse being sent if in the set position, or not sent if in the not set condition. In this case, no testing of the electronic detection device 73 in the protected area 75 has taken place.

If the command signal were longer than 400 milliseconds, the 0.40T timer 78 would produce an output which would momentarily appear, causing the three second one shot 79 to operate the relay 83 for three seconds. This causes the test device 74 in the protected area 75 to actuate for three seconds and eventually cause the electronic detection device 73 to go into an alarm state.

Also, the output of the 0.40T timer 78 causes the 30-second one shot 80 to enable gates 81, 82 and 85 and allow the latch 84 to operate. Gate 81 disconnects the output of the electronic detection device 73 from the McCulloh transmitter loop. This prevents, for 30 seconds, the McCulloh transmitter 54 from sending a signal that would be caused by the electronic detection device 73.

Gate 82 allows the output of the electronic detection device 73 to pass through to the latch 84. This would occur only if the electronic detection device 73 actually alarms. If the alarm takes place, the latch 84 latches and, by way of gate 85 controls the set sensor 86, which in turn determines that the reply signal to be sent.

Thus, if the alarm takes place, a second pulse will be sent. If no alarm takes place, only the first pulse will be sent. In this way, the operator at the central station can determine if the electronic detection device 73 has tested properly. In order to cause this test, a command signal or pulse longer than 0.40T is sent. In order to determine the set condition, a command pulse less than 0.40T is sent.

If the detection device is an ultrasonic alarm within a room of a building, the test sequence involves:

1. Temporarily disconnecting the ultrasonic sensor from the McCulloh transmitter;
2. Causing some disturbance in the room (such as running a fan motor in the room to disturb the ultrasonic sensor);
3. Sensing the output of the ultrasonic sensor to determine that it did in fact indicate an alarm condition; and
4. Sending a response to the central station (the reply signal usually being the set signal if the test actually cause the electronic detection to actuate).

Finally, there is a delay such as 26 seconds to allow the detection device to settle down before it is reconnected to the McCulloh transmitter.

It has been shown that the test and integrity system of this invention can supervise and test a large alarm system and can detect the plurality of functions without affecting existing equipment. That is, this invention with its plurality of function is completely compatible with McCulloh alarm circuits and will allow valuable information to be relayed to the central station without interrupting the basic alarm function in the McCulloh circuit.

While an embodiment and application of this invention has been shown and described, it will be apparent to those skilled in the art that many more modifications are possible without departing from the inventive concept herein described.

What is claimed as new and desired to be secured by Letters Patent of the United States is:

1. In a McCulloh circuit having a feed line and a return line including a DC voltage source powering a McCulloh receiver at a central station and a plurality of McCulloh transmitters with their associated set contacts located at subscriber locations, a test system therefore comprising;

an interrogation means releasably connected at the central station in the feed line and the return line to maintain the normal current in the McCulloh circuit when connected therein, said interrogation means including means for generating a command signal of the opposite polarity of a McCulloh alarm signal and means for receiving a reply signal; and a plurality of receiver units, each of said receiver units connected in series with a McCulloh transmitter and its associated set contacts at various subscriber locations, each of said receiver units including means for receiving the command signal and means for sequentially responding with a reply signal to said interrogation means without interfering with reception of McCulloh alarm signals.

2. The system as in claim 1 wherein said means for receiving the reply signal includes a first sense amplifier electrically connected in the return line of the McCulloh circuit.

3. The system as in claim 2 including a clamp circuit wherein said clamp circuit is electrically connected to said first and second sense amplifiers to reset said first and second sense amplifiers between replies from said receiver units.

4. The system as in claim 1 wherein said interrogation means is capable of being sequentially connected to a plurality of McCulloh circuits.

5. The system as in claim 1 wherein said means for generating a command signal provides separate reception of reply signals on the feed line and on the return line in order to determine the location of a fault.

6. The system as in claim 1 wherein said means for generating a command signal also is capable of generating a second command signal longer in duration than the command signal, said second command signal being sensed in said selected receiver unit thereby remotely causing a test therein.

7. The system as in claim 6 wherein the McCulloh transmitter is connected to the selected receiver unit being tested and is prevented from being activated by the test.

8. The system as in claim 1 wherein said means for receiving the reply signal includes a first sense amplifier electrically connected in the return line of the McCulloh circuit, thereby allowing system operation in the presence of a single fault on the line.

9. A method for testing equipment on a McCulloh circuit having a feed line and a return line without interference with the McCulloh alarm signal including a McCulloh receiver at a central station and a plurality of McCulloh transmitters with their associated set contacts located at subscriber locations, comprising the steps of:

1. sensing the McCulloh circuit to be tested for the presence of a McCulloh signal;
2. charging storage means to a predetermined level;
3. connecting an interrogation unit to the feed and return line of the McCulloh circuit when the storage means reaches the predetermined level to maintain the current in the McCulloh circuit at a constant level;
4. transmitting a command signal of the opposite polarity of a McCulloh alarm signal from the interrogation unit to a plurality of receiver units associated with McCulloh transmitters and set contacts at various subscriber locations;
5. receiving the command signal at the plurality of receiver units;
6. transmitting a reply signal sequentially from each receiver unit to the interrogation unit, the reply signal being of a magnitude so chosen to prevent interference with the McCulloh alarm signal; and
7. receiving the reply signal at the interrogation unit at its central station, the reply signal containing at least one pulse, the reply signal containing information as to line integrity and the set condition of the set contacts associated therewith.

10. The method of claim 9 wherein said system operates in the presence of a single fault on the line.

* * * * *